(No Model.)
W. C. EDGE.
SCARF PIN, &c.
No. 316,020.  Patented Apr. 21, 1885.
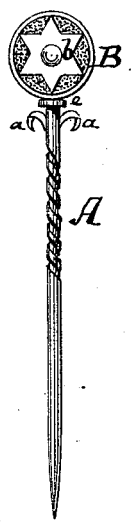
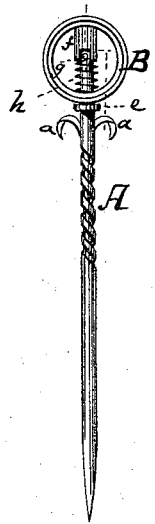
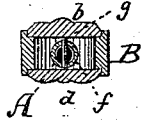
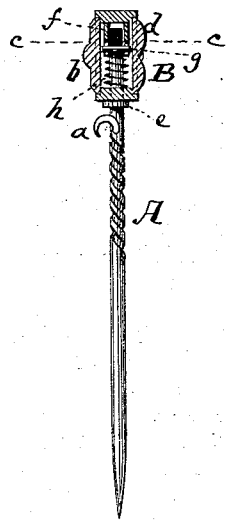
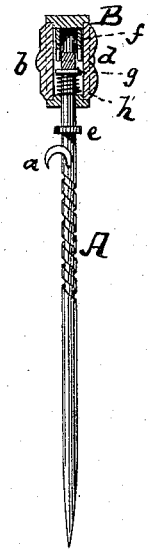
Witnesses:
John C. Tunbridge
John M. Speer.
Inventor:
William C. Edge
by his Attorneys
Briesen & Steele
N. PETERS, Photo-Lithographer, Washington, D. C.

UNITED STATES PATENT OFFICE.

WILLIAM C. EDGE, OF NEWARK, NEW JERSEY.

SCARF-PIN, &c.

SPECIFICATION forming part of Letters Patent No. 316,020, dated April 21, 1885.

Application filed April 21, 1884. (No model.)

*To all whom it may concern:*

Be it known that I, WILLIAM C. EDGE, of Newark, county of Essex, and State of New Jersey, have invented an Improvement in Scarf-Pins and Similar Ornaments, of which the following is a full, clear, and exact description, reference being made to the accompanying drawings.

Figure 1 is a face view of my improved scarf-pin. Fig. 2 is a face view thereof showing the head reversed. Fig. 3 is a face view of the same when the ornamental face-pieces have been removed. Fig. 4 is a vertical central section of the same; Fig 5, a similar section showing the head raised. Fig. 6 is a horizontal section on the line $c\ c$, Fig. 4.

This invention relates to an improvement in scarf-pins, breastpins, and analogous ornaments by which the ornamental face thereof is made reversible, so that the wearer may display either side thereof at pleasure.

The invention consists in swiveling the head of such a pin to its body or shank, and in locking it thereto; also in providing said shank with claws for preventing it from turning when the head is being reversed.

In the drawings, the letter A represents the shank or pin portion of a scarf-pin. The same has as its back rearwardly and downwardly projecting claws $a\ a$. B is the head of said pin. It is of circular or other form, as in Figs. 1, 2, and 3, is made hollow, and has one face, $b$, provided with one ornamentation and the other face, $d$, with another ornamentation. It may have more than two such faces. This head B is set upon and swiveled to the upper part of the shank A, resting on a shoulder or enlargement, $e$, which is formed on said shank.

From the upper part of the hollow head B extends downward within the same a tube, $f$, which has notches in its lower edge. This tube fits over the uppermost part of the shank A and serves to swivel the head B to the shank or pin A. A pin, $g$, which is fitted through said shank enters the notches in said tube $f$. A spring, $h$, bearing on the lower part on the inside of the hollow head B and against the under side of the pin $g$, holds said head on the shoulder $e$ and retains the notches of the tube $f$ in engagement with the pin $g$. When the head is to be reversed, it is first raised, as in Fig. 5, so as to clear the tube $f$ from the pin $g$ and compress the spring $h$. The head can now be turned to bring another face to the front, and is then let go again so that the spring will draw it back to the shoulder $e$ and re-engage the pin $g$ in notches of the tube $f$. While turning the head the claws $a$ entering the fabric prevent the pin A from turning.

The device is applicable to scarf-pins, breast-pins, and all other articles of ornamental jewelry.

I claim—

1. The swiveled hollow head B, combined with notched tube $f$, shank A, pin $g$, and spring $h$, substantially as herein shown and described.

2. The pin A, provided with claws $a\ a$, which point downwardly in substantially the same direction as the pin, as set forth.

3. The pin A, having claws $a$, combined with the swivel-head B, substantially as herein shown and described.

WILLIAM C. EDGE.

Witnesses:
    WILLY G. E. SCHULTZ,
    HARRY M. TURK.